United States Patent [19]

Hartman et al.

[11] Patent Number: 4,818,558

[45] Date of Patent: Apr. 4, 1989

[54] FIBER/TOFU FOOD PRODUCT AND METHOD FOR MAKING THE SAME

[75] Inventors: Warren E. Hartman; Richard S. Leiss, both of Worthington; Robert S. Updegraff, Powell, all of Ohio

[73] Assignee: Worthington Foods, Inc., Worthington, Ohio

[21] Appl. No.: 81,184

[22] Filed: Aug. 4, 1987

[51] Int. Cl.[4] .................... A23L 1/20; A23J 1/14
[52] U.S. Cl. .................................. 426/634; 426/656
[58] Field of Search ........................... 426/656, 634

[56] References Cited

U.S. PATENT DOCUMENTS

| | | | |
|---|---|---|---|
| 4,391,835 | 7/1983 | Katayama et al. | 426/656 |
| 4,490,397 | 12/1984 | Maurice et al. | 426/656 |

FOREIGN PATENT DOCUMENTS

| | | | |
|---|---|---|---|
| 9187745 | 10/1984 | Japan | 426/656 |
| 1115459 | 6/1985 | Japan | 426/656 |
| 0241869 | 11/1985 | Japan | 426/656 |
| 1135561 | 6/1986 | Japan | 426/656 |

Primary Examiner—Donald E. Czaja
Assistant Examiner—Helen Pratt
Attorney, Agent, or Firm—John L. Gray

[57] ABSTRACT

A process for making a fibrous tofu food product having a unique structure, texture, and mouthfeel. Proteinaceous fibers, such as chopped and fluffed wet spun soy isolate fibers, are dispersed in soymilk to form a mixture. A selected edible acid (or acids), calcium and/or magnesium salts, are added to the mixture. The coprecipitate mixture exhibits physical and chemical binding which produces the unique structure or texture. The resulting coagulative mixture can then be formed into desired sizes and shapes.

33 Claims, No Drawings

FIBER/TOFU FOOD PRODUCT AND METHOD FOR MAKING THE SAME

BACKGROUND OF THE INVENTION

This invention relates to tofu food products, and to the methods of manufacturing them. More particularly, it relates to simulated meat products or meat analogs, and to the methods by which they are made.

For convenience in describing this invention, traditional tofu manufacture from soybeans has been used. Tofu is made by a process in which whole soybeans are soaked, ground, mixed with water, heated to produce a slurry, and filtered so that the ground soybean residue is separated from the liquid. The resulting curd is coagulated from the whey portion of the soymilk by the use of acids and/or salts. "Tofu" is the most widely used English language term for this product but it has also been called "soybean curd", "bean curd", and "bean cake". It is typically classified into three general groups: traditional, non-traditional, and specialty. The traditional group is further divided into "pressed" and "silken" tofus and the non-traditional group includes four categories one of which is tofu with fiber. The "tofu with fiber" designation means that the tofu contains all or at least 75% of the dietary fiber in the soybean cotyledons and/or seed coat that is normally removed in the process of making soymilk from whole soybeans. As will be apparent, this is very different from the fiber/tofu food product of the present invention.

Much work has been done to provide satisfactory meat analog food products from inexpensive texturized vegetable protein particles, including soybean. Examples of such products include those described in the following U.S. Pat. Nos. 3,772,035, 3,914,443, 4,061,784, 4,132,809, 4,265,917, and 4,275,084, each of whose contents are hereby incorporated by reference. To be accepted as a simulated meat substitute, a product must have a certain texture which imparts the appearance, chewy texture, and mouthfeel associated with meat. The chewy texture refers to and includes the physical characteristics of protein material which gives it a feeling of resilience, elasticity and resistance to shear when chewed. Although this chewy texture is preferably evaluated subjectively by chewing the protein, it alternatively can be measured objectively by measuring its shear and press value, such as, for example in the method described in U.S. Pat. No. 3,778,522.

To be suitable, the meat analogs must also bind effectively. In the past this was accomplished by using binding materials which were either entirely or partly made of egg white. However, the relatively high cost of egg whites increases the price of what otherwise are cheaper meat analogs. Some examples of such binding materials and meat analog products are described in U.S. Pat. Nos. 4,061,784, 3,343,963, and 3,594,192 and 3,914,443, the contents of each of which is incorporated by reference. Ovalbumin (or egg albumin) when used as the sole binder for certain preparations requires heating and rehydration, and often results in a product that lacks juiciness and a desirable meat-like mouthfeel. Other compounds have been used as binders but they have limited physical/chemical properties.

SUMMARY AND OBJECTS OF THE INVENTION

In summary, this invention comprises a new tofu product and a means for making it by dispersing edible fibers in soymilk and co-precipitating the fibers and protein solids therefrom. Co-precipitation is achieved by adding a conventional coagulant, such as calcium sulphate and maintaining the temperature of the slurry at an easily predetermined point, e.g., 165° F. Edible proteinaceous fibers, such as wet spun soy isolate fibers, are preferred but not essential since any fibers which are edible, and not otherwise harmful, may be utilized in this process.

The resulting product will contain between about 2% to about 40% by weight fibers, based on the total weight of the product. Of course, other ingredients may be incorporated in the tofu product of this invention, such as flavorings, sweeteners, seasonings, and the like.

Accordingly, it is the principal object of the present invention to provide a new tofu food product having a different texture and mouthfeel.

Another object of the present invention is to provide a novel high protein and inexpensive tofu food product.

A further object of the present invention is to provide a novel tofu food product which has the texture and consistency to provide the sensation of "chewing" in the course of ingesting the product.

A still further object of the present invention is to provide an improved tofu meat analog which uses a low cost binding component which causes the product to have a highly desirable and unique texture and mouthfeel.

Those persons having ordinary skill in this art or technology will be able to perceive other objects and advantages of the present invention from the following description.

DETAILED DESCRIPTION OF PREFERRED EMBODIMENTS OF THE INVENTION

The present invention comprises incorporating edible fibrous material into a protein containing slurry and then co-precipitating the solid materials therefrom. The edible fibers are thereby entrapped throughout the co-precipitated protein matrix. As used in this specification and the following claims, the term "co-precipitation" means the coagulation of the proteinaceous solids (curds) in soymilk such that edible fibers dispersed therein are entrapped and precipitated along with proteinaceous matrix from the liquid portion (whey) of the soymilk.

One source of edible fibers may be a highly purified soybean protein from isolate that is formed into monofilaments as taught in U.S. Pat. Nos. 2,682,466, or in 3,047,395, 3,142,571, 3,488,770, 4,498,794, 3,759,715, 3,778,522, 3,794,731, each of whose contents are incorporated by reference in their entirety. Other suitable edible fibers may be derived from other protein sources, polysaccharides, and natural forming materials such as fungal mycelium, among others. The type of fibers chosen will be dictated by the desired texture or other properties of the ultimate product.

Tofu can be formed from any product whose protein portion can be collected and separated from the liquid portion using conventional coagulation techniques, including acid precipitation means.

Any one of a variety of known techniques can be employed to make the fibrous tofu food product of this invention provided that prior to forming the tofu curd, edible fibers are dispersed in the soymilk and co-precipitated from the whey to produce the desired product. In a preferred embodiment, soy flour, or cold soy beans after being rehydrated by soaking in water and ground, will be mixed with a sufficient amount of water to form a slurry which is then cooked and ultimately filtered to produce soymilk. Wet spun vegetable fibers, such as soy bean fibers, are then dispersed in the soymilk in an amount (between about 2%–40%) which is usually dictated by the requirements for the desired product. Any of the conventional means for preparing and mixing of such fibers in the soymilk may be used in this stage of the process. Additional additives such as processing compounds, flavorings, spices, sweeteners, and food colorings may be included so long as they are food quality ingredients. A coagulant is then added to the soymilk in a conventionally predetermined amount or at least sufficient to effect coagulation. Any one or more of the conventional food grade coagulants may be used in this regard, but typically the coagulant will be a magnesium salt, suoh as magnesium chloride, or a calcium salt, such as calcium sulfate. Acids or acid forming compounds such as glucono delta-lactone may alternatively be added to effect coagulation. The temperature of the fiber-containing soymilk should be maintained at a level conducive to coagulation, i.e. usually greater than about 165° F. Accordingly, if the fibrous material, such as wet spun vegetable fibers, has a temperature significantly lower than the minimum temperature when added to the soymilk, care should be taken to heat the milk to the minimum temperature before the coagulant is added thereto. The resulting co-precipitated fibrous curd is then separated from the whey and shaped into the desired food product by any conventional means, i.e., by hand or by using suitable molds, forms, presses, converging conveying belts, or any of the known means for forming a shaped unitary food product. The shaped product may also be further treated, such as by heating, coating, and the like.

The fiber/tofu food product of this invention exhibits unique and unexpected textural properties which exceed what one might expect from the mere physical combining of edible fiber and tofu. In fact, when compared to traditional tofu, the fiber/tofu of the present invention has a fibrous appearance much like muscle tissue and when chewed has a mouthfeel very similar to that of natural meat products. When suitably flavored with hydrolyzed vegetable proteins, natural and/or artificial flavors, edible salts, spices or other flavor ingredients, it thus makes an excellent meat analog. It can be easily sliced, diced or left in large blocks, depending upon the desired meat analog end use.

EXAMPLE I

At least 20 pounds of dry, whole soybeans are soaked in an excess (40 pounds or more) of cold tap water, and then allowed to sit quiescently overnight. The excess water is then drained off and the 40 pounds of rehydrated soybeans are ground through a mill or grinder. A sufficient amount of water is continuously added during the grinding to keep the slurry moving through the mill. Sufficient water to bring the total slurry weight up to approximately 180 pounds is then added. The slurry is next transferred to a pressure cooker and the temperature raised, through steam injection, to 240° F., and that temperature is then held for approximately 40 seconds. The slurry or soymilk is vented out of the pressure cooker and strained through a coarse mesh cloth. Okara (soy residue) is pressed in the bag to remove the trapped soymilk and the okara is then discarded. The resulting soymilk is strained through a fine mesh cloth and then into a container. This procedure yields approximately 200 pounds of 200° F. plus soymilk. Ninety-three grams of lecithin, 533 grams of corn oil and 180 grams of yeast flavor powder are added, and this mixture is agitated using a Tekmar High Speed Shear Mixer for 30 seconds.

In a separate step, 10 pounds of wet spun soy isolate fiber are fluffed in a Hobart Mixer on speed "2" for 30 seconds, and the fluffed acid fiber is then stirred into the hot soymilk mixture. Two hundred fifty grams of a 10% water solution of calcium sulfate are stirred into the resulting mixture. The agitation is continued until the fiber and protein in solution begin to precipitate at which time the mixture is allowed to sit quiescently for approximately 15 minutes. The liquid or whey is separated from the co-precipitate (or fiber/tofu) by straining the co-precipitate through a screen with 3/16th inch diameter holes. The drained fiber/tofu is then placed in a cloth lined pressing tray and pressed at 80 psig for approximately ten minutes. The resulting flavored fiber/tofu block is then removed from the cloth and stored in cold water until used. Approximately 40 pounds of flavored fiber/tofu are produced by this procedure. On this basis the product contains approximately 25 percent by weight of wet spun fiber.

EXAMPLE II

Twenty pounds of soybean are soaked, ground, cooked, and extracted in a standard procedure. Three and one half pounds of wet spun fiber (chopped and fluffed) are dispersed in the aqueous extract. After the fiber has been well dispersed in the extract, calcium salts are added and the fiber/tofu is co-precipitated in a normal fashion. The fiber/tofu co-precipitate is then collected, drained and pressed per standard batch procedures. On this basis, the fiber/tofu product contains approximately 16 to 18% by weight wet spun fiber. At this level, the resultant product is unexpectedly improved or modified in texture, elasticity and shear, and exhibits some degree of stability to adhere to itself or to knit back together even after the structure is broken down. The product slices well and holds its size and shape well even after cooking or after being subjected to boiling water for ten minutes. The product when incorporated in a vegetable soup absorbs flavors and color much better than traditional tofu. When simmered in a savory broth, the product appears to absorb color and flavor much better than traditional tofu, because the incorporated fibers tend to have a wicking effect.

The resulting fiber/tofu product can be flavored and shaped into any meat analog such as chicken analog, meatloaf analog, hamburger patty analog, meatball analog, or any other familiar meat products. It can be shaped in any physical operation such as by molding and pressing which causes the plurality of particulate texture protein particles to be aggregated together as a unit and conform to a particular configuration. The shaping, for example, can be done by hand, suitable molds, forms, presses, or conveyor belts, or any other suitable means.

While the invention has hereinabove been described with reference to preferred embodiments thereof and several modifications thereto, it should be understood that further modifications or variations may be easily made by those skilled in the art without departing from the spirit and scope of this invention as defined by the appended claims.

What is claimed is:

1. A method of making a tofu food product comprising:
   dispersing monofilament edible fibers selected from the group consisting of proteinaceous fibers, polysaccharide fibers and mixtures thereof, in an aqueous vegetable protein extract to form a mixture, and
   coprecipitating a fibrous curd from said mixture.

2. The method of claim 1 wherein said co-precipitation is achieved by adding a coagulant to said mixture.

3. The method of claim 2 wherein said coagulant is selected from the group consisting of magnesium salts and calcium salts, or mixtures thereof.

4. The method of claim 2 wherein said coagulant is an acid or an acid-forming compound to said mixture.

5. The method of claim 4 wherein said acid-forming compound is a food-grade organic acid.

6. The method of claim 5 wherein said organic acid is glucono delta-lactone.

7. The method of claim 2 wherein said coagulant is a mixture of one or more of the salts of claim 3 and the acid or acid-forming compound of claim 4.

8. The method of claim 1 further comprising separating the resulting co-precipitated curd from the liquid.

9. The method of claim 8 further comprising pressing said curd to form a shaped fiber/tofu product.

10. The method of claim 9 further comprising cutting said fiber/tofu product to the desired configuration and size.

11. The method of claim 8 further comprising hand forming said curd into a desired shape.

12. The method of claim 1 wherein said protein extract is soymilk.

13. The method of claim 12 further comprising processing the soymilk from whole soybeans.

14. The method of claim 12 further comprising processing the soymilk from soybean flour.

15. The method of claim 1 wherein said fibers are wet spun proteinaceous fibers.

16. The method of claim 1 wherein said edible proteinaceous fibers are wet spun vegetable fibers.

17. The method of claim 16 wherein said vegetable fibers are soybean fibers.

18. The method of claim 17 wherein said soybean fibers are high purified soybean protein from isolate formed into monofilaments.

19. The method of claim 16 wherein said vegetable fibers are peanut or garbonzo fibers.

20. The method of claim 1 wherein said edible fibers comprise a mixture of two or more substances selected from the group consisting of proteinaceous and polysaccharide fibers.

21. The method of claim 1 wherein said dispersing includes chopping and fluffing said fibers and thereafter mixing said fibers into said soymilk.

22. The method of claim 1 further comprising the steps of collecting, draining, and pressing the co-precipitated curd.

23. The method of claim 1 further comprising, collecting and shaping the curd into a unitary food product.

24. A fiber/tofu food product produced by the process of claim 23.

25. A textured fiber/tofu foodstuff comprising a co-precipitated tofu curd having edible fibers dispersed therein, said fibers being selected from the group consisting of proteinaceous and polysaccharide fibers, and mixtures thereof.

26. The foodstuff of claim 25 wherein said fibers comprise about 2–40% by weight of the total weight of said foodstuff.

27. The foodstuff of claim 25 further comprising added ingredients selected from the group consisting of flavorings, spices, vegetable oils, preservatives, food colors and mixtures thereof.

28. The foodstuff of claim 25 wherein said fibers comprise vegetable fibers.

29. The foodstuff of claim 28 wherein said vegetable firbers comprise spun soy bean fibers.

30. The foodstuff of claim 25 wherein said fibers comprise polysaccharide fibers.

31. The foodstuff of claim 25 wherein said fibers are finely chopped and generally evenly dispersed in said tofu curd.

32. A method of making a tofu food product comprising:
   dispersing monofilament edible fibers selected from the group consisting of proteinaceous fibers, polysaccharide fibers, and fibers containing varying concentrations of polysaccharide and protein, and mixtures thereof in an aqueous vegetable protein extract to form a mixture, and
   co-precipitating a fibrous curd from said mixture.

33. A textured fiber/tofu foodstuff comprising a co-precipitated tofu curd having edible monofilament fibers dispersed therein, said fibers being selected from the group consisting of proteinaceous fibers, polysaccharide fibers, and fibers containing varying concentrations of polysaccharide and protein, and mixtures thereof.

* * * * *